US006920078B2

(12) United States Patent
Cho

(10) Patent No.: US 6,920,078 B2
(45) Date of Patent: Jul. 19, 2005

(54) CMOS IMAGE SENSOR HAVING ROW DECODER CAPABLE OF SHUTTER TIMING CONTROL

(75) Inventor: Taehee Cho, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/706,778

(22) Filed: Nov. 12, 2003

(65) Prior Publication Data

US 2004/0119863 A1 Jun. 24, 2004

(30) Foreign Application Priority Data

Nov. 11, 2002 (KR) ................................ 10-2002-0069540

(51) Int. Cl.$^7$ ................................................. G11C 8/00
(52) U.S. Cl. ............................. 365/230.06; 365/189.08
(58) Field of Search ....................... 365/230.06, 189.08, 365/230.08, 230.01

(56) References Cited

U.S. PATENT DOCUMENTS

| | | | | | |
|---|---|---|---|---|---|
| 5,912,857 | A | * | 6/1999 | Kim et al. ............. | 365/230.06 |
| 6,198,686 | B1 | * | 3/2001 | Takita et al. ........... | 365/230.06 |
| 6,243,319 | B1 | * | 6/2001 | Yokozeki ............... | 365/230.06 |
| 6,320,799 | B1 | * | 11/2001 | Miyazaki et al. ........... | 365/200 |
| 2002/0089597 | A1 | | 7/2002 | Pearson ...................... | 348/308 |

FOREIGN PATENT DOCUMENTS

KR          19728       4/2000

OTHER PUBLICATIONS

English Abstract Only.

* cited by examiner

*Primary Examiner*—Anh Phung
(74) *Attorney, Agent, or Firm*—F. Chau & Associates, LLC

(57) ABSTRACT

A CMOS image sensor having a row decoder capable of shutter timing control is provided, the row decoder addressing to a plurality of pixels arranged in rows and columns in a CMOS image sensor and including a plurality of unit arrays, wherein the unit arrays include a first NAND gate for generating a reset gate signal in response to an address signal and a reset signal, a second NAND gate for generating a selection gate signal in response to the address signal and a selection signal, a latch for resetting an output thereof in response to an address latch signal and latching the address signal as the output in response to the address latch signal and the address signal, a third NAND gate for receiving the address signal and a transmitted signal, a fourth NAND gate for receiving the output of the latch and a shutter transmitted signal, and an OR gate for receiving the outputs of the third and fourth NAND gates and generating a transmitted gate signal; wherein shuttering of a row address is latched in accordance with the blank interval of the horizontal synchronization signal using latches of the row decoder, and the shuttering operation is performed sequentially increasing the shuttering row address by 1, the invalid data that are not shuttered are thereby prevented from being generated though the row shutter value is changed suddenly.

18 Claims, 15 Drawing Sheets

(BACKGROUND)

(BACKGROUND)

(BACKGROUND)

Image Data Signal = Reset Level − Signal Level (BACKGROUND)

(BACKGROUND)

(BACKGROUND)

(BACKGROUND)

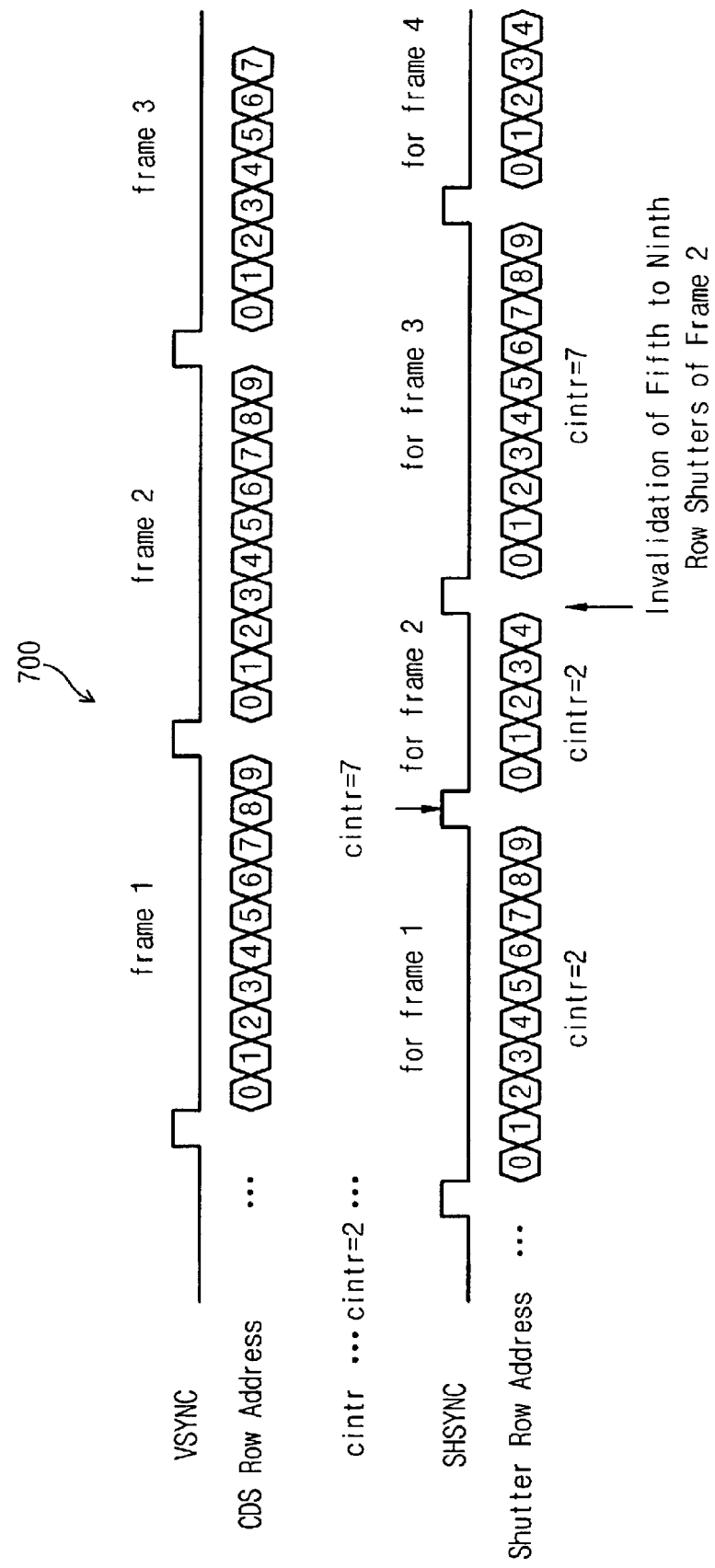

(BACKGROUND)

Fig. 9 (BACKGROUND)

CMOS IMAGE SENSOR HAVING ROW DECODER CAPABLE OF SHUTTER TIMING CONTROL

BACKGROUND OF THE INVENITON

1. Field of the Invention

The present invention relates to semiconductor integrated circuits, and more particularly, to semiconductor integrated circuits having row decoders capable of timing control.

2. Description of the Related Art

Generally, an image sensor captures an image by using an optical sensing semiconductor element. The image sensor usually includes a pixel array with transistors and several sensing elements, such as photodiodes. The image sensor receives light from objects and generates an electrical image signal. An image sensor manufactured using Complementary Metal Oxide Semiconductor ("CMOS") techniques is called a CMOS image sensor.

FIG. 1 shows a block diagram illustrating a conventional CMOS image sensor. Referring to FIG. 1, a CMOS image sensor 100 includes an active pixel sensor ("APS") array 110, a row decoder 120, a row driver 130, a correlated double sampling and digital converting ("CDS&ADC") unit 140, a column decoder 150 and a CMOS image sensor ("CIS") controller 160. The APS array 110 is provided with active pixel sensors arranged thereon. A predetermined active pixel in the APS array 110 is addressed through the row decoder 120 and the column decoder 150. The CDS&ADC unit 140 samples data of the active pixel under the control of the CIS controller 160 and operates to obtain high quality images.

FIG. 2 shows a schematic diagram of a unit pixel 200, and FIG. 3 shows a relevant timing diagram 300. Operation of the unit pixel 200 may be better understood with reference to the timing diagram 300. The unit pixel 200 includes a reset transistor MR, a transmitting transistor MT, a driver transistor MD and a selection transistor MS. Initially, the reset transistor MR is turned on in response to a high level of a reset gate signal RG so that a floating diffusion node FD is pre-charged to a high level. The driver transistor MD is turned on in response to a high level of the floating diffusion node FD and the selection transistor MS is turned on in response to a high level of a selection gate signal SEL so that an output node OUT gets to be a high level called the first level. The reset transistor MR is turned off in response to a low level of a reset gate signal RG so that the output node OUT becomes high level called the second level. After that, if the transmitting transistor MT is turned on in response to the transmitting gate signal TG, the output node OUT falls to a third level. The difference between the second level and the third level of the output node OUT is outputted as an actual image data signal.

FIG. 4 illustrates voltage variations 400 of a photodiode PD and a floating diffusion node FD based on the cross-section of the unit pixel 200 shown in FIG. 2. Reference indicia "i" indicates the initial state when the reset gate signal RM is high level. Reference indicia "ii" indicates that the well of the photodiode PD is emptied in response to the high level of the transmitting gate signal TG by shuttering operation. Reference indicia "iii" indicates that the potential of the transmitting gate is raised in response to the low level of the transmitting gate signal TG after shuttering. Reference indicia "iv" indicates that the photodiode PD integrates the light. Reference indicia "v" indicates that the potential of the reset gate is raised in response to the low level of the reset gate signal RG. Reference indicia "vi" indicates that the potential of the transmitting gate is lowered in response to the high level of the transmitting gate signal TG and the potential of the sensing node FD is changed. The variation of the potential of the floating diffusion node FD is an image data signal and then the CDS is performed to sample image data.

FIG. 5 shows a schematic diagram of a general circuit of the row decoder 120 of FIG. 1. Referring to FIG. 5, an i-th row reset gate signal $RG_i$, an i-th transmitting gate signal $TG_i$, an i-th selection gate signal $SEL_i$, an $i+1^{st}$ row reset gate signal $RG_{i+1}$, an $i+1^{st}$ transmitting gate signal $TG_{i+1}$, an $i+1^{st}$ selection gate signal $SEL_{i+1}$, an $i+2^{nd}$ row reset gate signal $RG_{i+2}$, an $i+2^{nd}$ transmitting gate signal $TG_{i+2}$, and an $i+2^{nd}$ selection gate signal $SEL_{i+2}$ are generated by the combination of row address signals $A_i$, $A_{i+1}$, and $A_{i+2}$, a transmitted signal TX, a selection signal SEL and a reset signal RX.

FIGS. 6A and 6B illustrate operation waveforms 600 and 610, respectively, of unit cells connected to two rows and one column, such as unit cells connected to the p-th row and the q-th row, respectively. If the unit cell connected to the p-th row performs CDS operation as shown in FIG. 6A, the unit cell connected to the q-th cell represents integration operation of the photodiode as shown in FIG. 6B. In other words, the integration operation of the q-th row is performed during the time 1H–CDS that results from subtracting the CDS operation of the p-th row from the 1H time representing the period of horizontal synchronization signal HSYNC.

FIG. 7 illustrates an example of row addressing for frame data, indicated generally by the reference numeral 700. Referring to FIG. 7, the first to third frame data are inputted in accordance with a vertical synchronization signal VSYNC. Suppose that ten row addresses 0 to 9 are set for one frame data. The row shutter value cintr determines the shutter exposure time, is stored in a register of CIS controller 160 shown in FIG. 1, and controls the shuttering operation. The row address that is shuttered if the row shutter value is two is inputted before the CDS row address by two rows and shutters the unit cells connected to the corresponding addresses so that the integration operation is performed. The first frame data are matched to shutter row addresses 0 to 9 and CDS row addresses 0 to 9, and the image data signals of the selected unit cells are transferred to the CDS&ADC unit 140 of FIG. 1 without any losses. This operation is performed as represented by the timing chart shown in FIG. 8.

Referring to FIG. 8, a timing chart is indicated generally by the reference numeral 800. During the first 1H time, the CDS operation is performed for the $0^{th}$ row address and the shuttering operation is performed for the $2^{nd}$ row address. During the second 1H time, the CDS operation is performed for the first row address and the shuttering operation is performed for the third row address. During the third 1H time, the CDS operation is performed for the second row address at which shuttering operation is performed during the first 1H time.

However, if the CDS operation and the shuttering operation are performed using the decoder 120 shown in FIG. 5, the following problems can be found. Referring to FIG. 7, if the row shutter value cintr is set be 7, only the shutter row addresses 0 to 4 are addressed for the second frame data and the shuttering operation is performed, but the shuttering operation is not performed for the remaining shutter row addresses 5 to 9. This is because the shutter row addresses 0 to 9 for the third frame are inputted in accordance with a shutter synchronization signal SHSYNC to satisfy the row shutter value cintr=7 for the following third frame. The third frame is matched to shutter row addresses 0 to 9 and CDS row addresses 0 to 9 and the image data signals of the selected unit cells are transferred to CDS&ADC unit 140 of FIG. 1 without any losses. Here, the data of the unit cells corresponding to the fifth to ninth addresses of the second frame are transferred to the CDS&ADC unit 140 without the long time shutter exposure of the row shutter value cintr=7. This causes the problem that the second frame data become invalid data.

Accordingly, what is needed is a row decoder for a CMOS image sensor that can control exposure time without increasing the layout area.

SUMMARY OF THE INVENTION

These and other drawbacks and disadvantages of the prior art are addressed by a CMOS image sensor having a row decoder that substantially obviates one or more problems due to the limitations and disadvantages of the related art.

It is a feature of embodiments of the present invention to provide a CMOS image sensor having row decoder that can control exposure time substantially without increasing the layout area.

Additional features and advantages of the invention will be set forth in part in the description which follows and in part will become apparent to those having ordinary skill in the pertinent art upon examination of the following, or may be learned from practice of the invention. The objectives and other advantages of the invention may be realized and attained by the structure particularly pointed out in the written description and claims hereof as well as the appended drawings, or equivalents.

BRIEF DESCRIPTION OF THE DRAWINGS

In the drawings:

FIG. 7 illustrates an example of row addressing for frame data of FIG. 2;

DETAILED DESCRIPTION OF PREFERRED EMBODIMENTS

Reference will now be made in detail to preferred embodiments of the present invention, examples of which are illustrated in the accompanying drawings. However, it shall be understood that the present invention is not limited to the exemplary embodiments illustrated herein, and that the embodiments herein are rather introduced to provide easy and complete understanding of the scope and spirit of the present invention. To address the problems outlined in the Background section of the present disclosure, several non-preferred alternatives have been considered, as discussed with respect to FIGS. 9 through 11.

Figure 9:
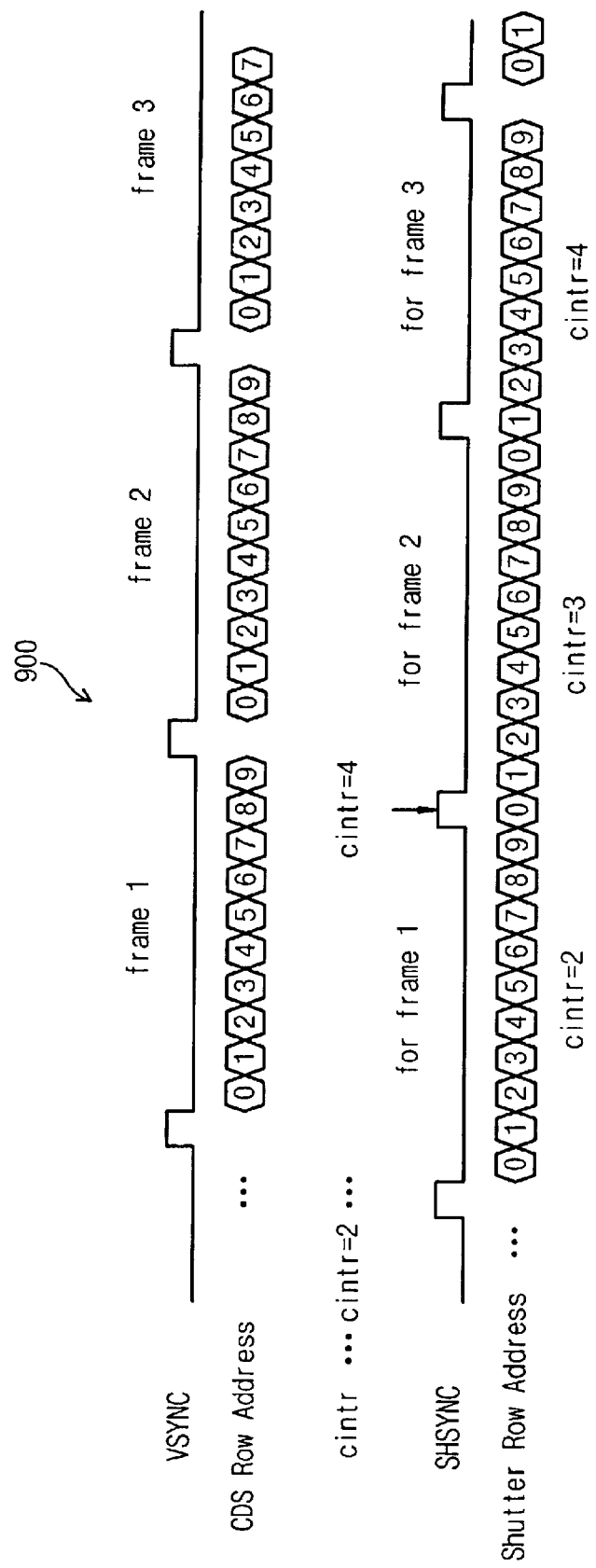
FIG. 9 illustrates another example of row addressing for frame data.
Figure 10:
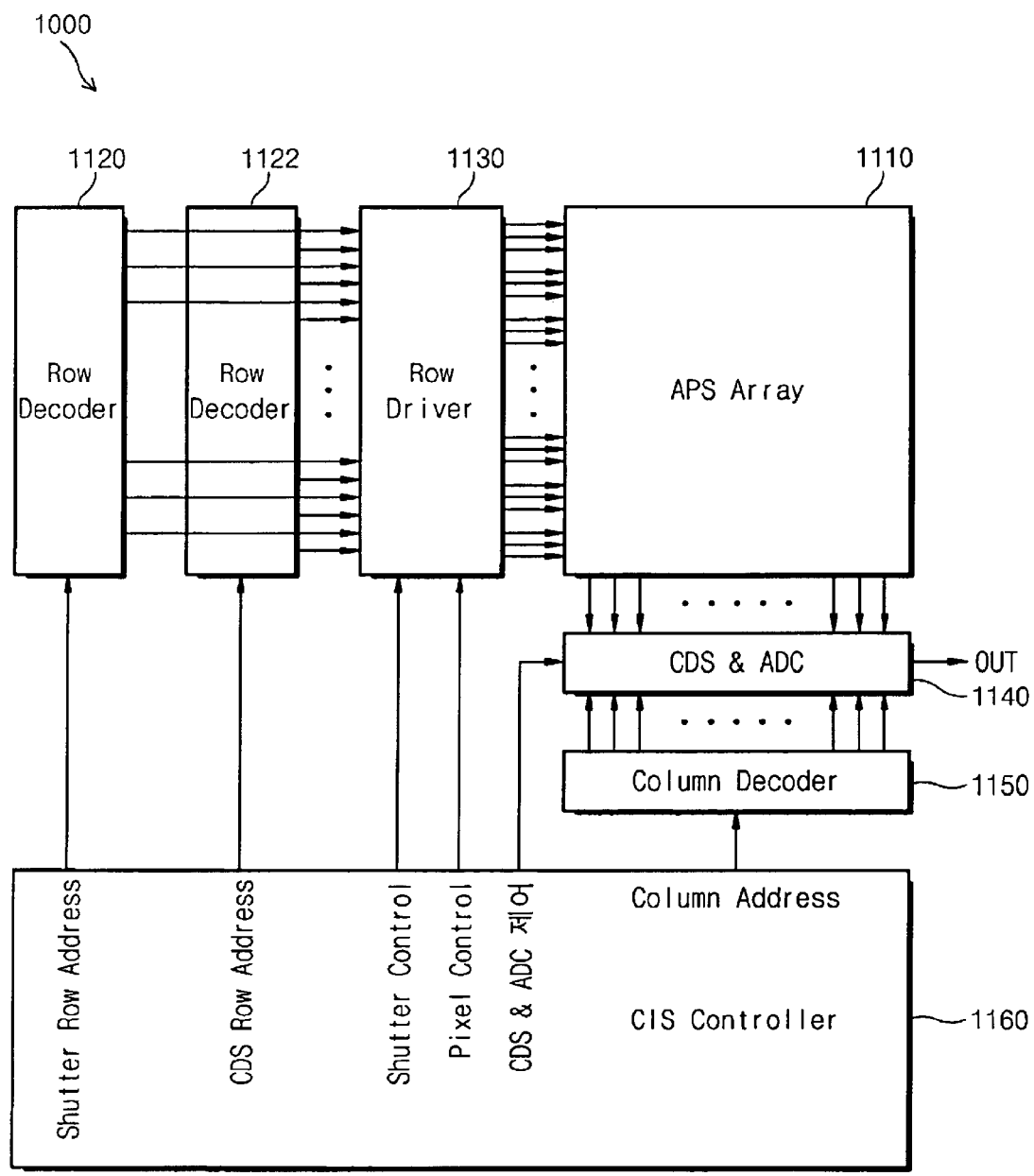
FIG. 10 shows a block diagram of a CMOS image sensor having two row decoders.
Figure 11:
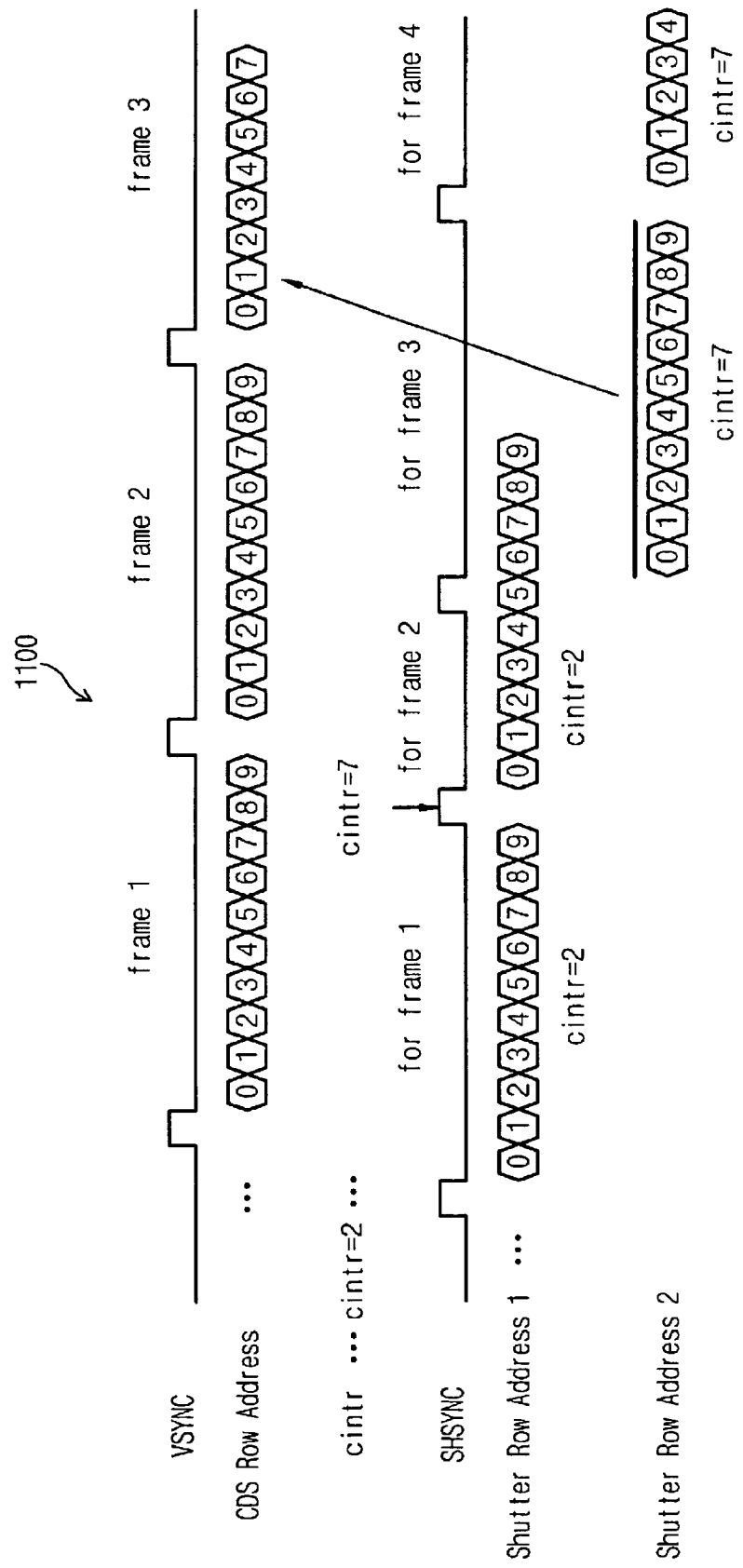
FIG. 11 illustrates row addressing for frame data using the CMOS image sensor shown in FIG. 10.

As shown in FIG. 9, a timing diagram is indicated generally by the reference numeral 900. Here, the row shutter value may be adjusted to prevent invalid data from being generated, so that the shutter row address of the second frame can be inputted in accordance with the last shutter row address of the first frame. Unfortunately, the method illustrated in FIG. 9 causes the problem that the frame data are delayed. As shown in FIG. 10, a CMOS image sensor having two row decoders is indicated generally by the reference numeral 1000. Here, the shutter row address 1 and the shutter row address 2 may be generated for the second frame and third frame separately using the two row decoders 1120 and 1122 so that the shuttering operation is performed as indicated generally by the timing diagram 1100 shown in FIG. 11. Unfortunately, the method illustrated in FIGS. 10 and 11 causes the problem that the layout area of the CMOS image sensor gets larger.

Hereinafter, a preferred embodiment of the present invention will be described with reference to FIGS. 12 through 15.

Figure 2:
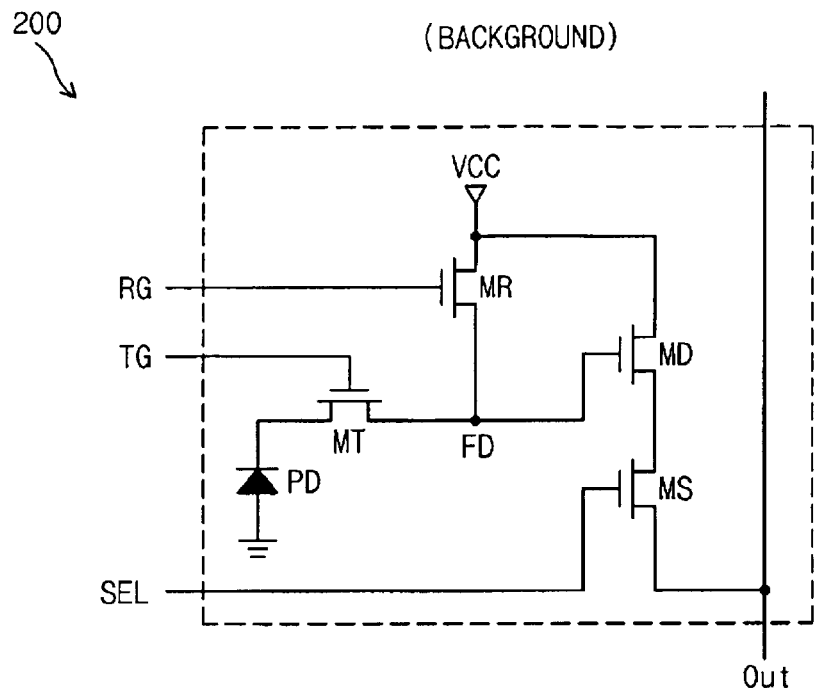
FIG. 2 illustrates a unit pixel for inventive and conventional CMOS image sensors.
Figure 3:
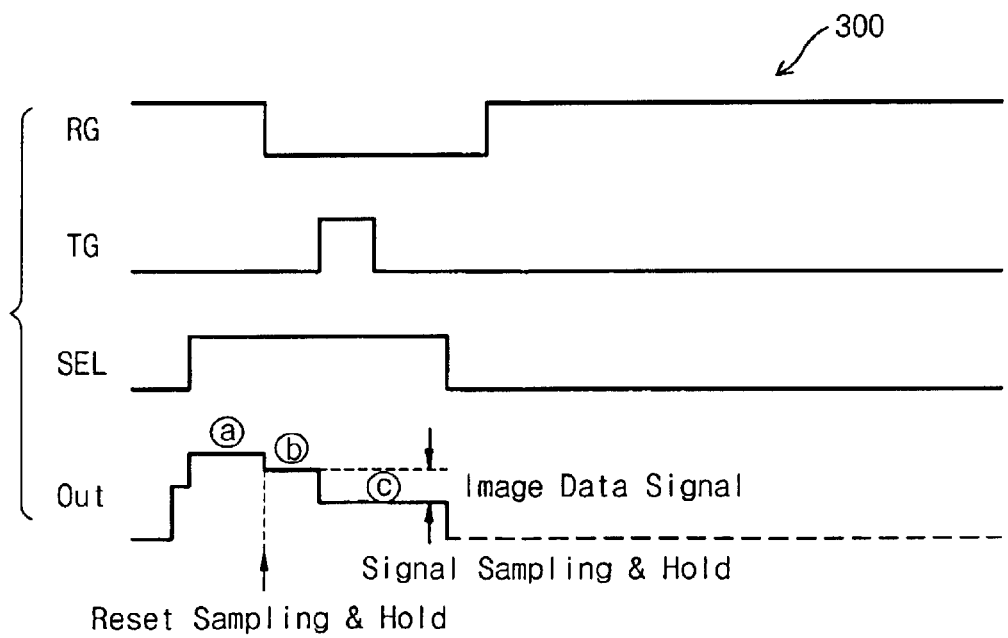
FIG. 3 illustrates operational timing of the unit pixel shown in FIG. 2.
Figure 4:
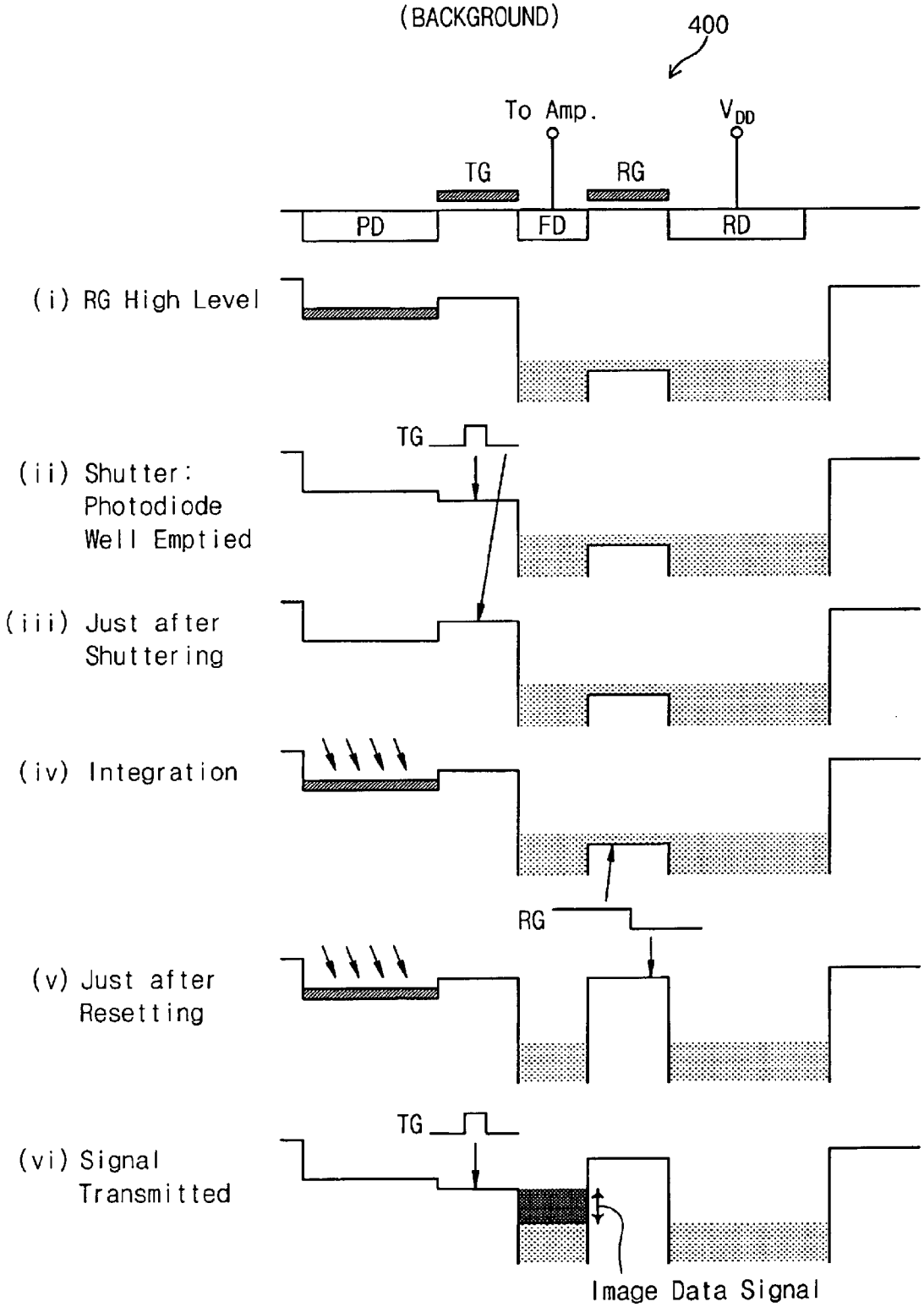
FIG. 4 illustrates voltage variations of a photodiode and a floating diffusion node based on the cross-section of the unit pixel shown in FIG. 2.
Figure 5:
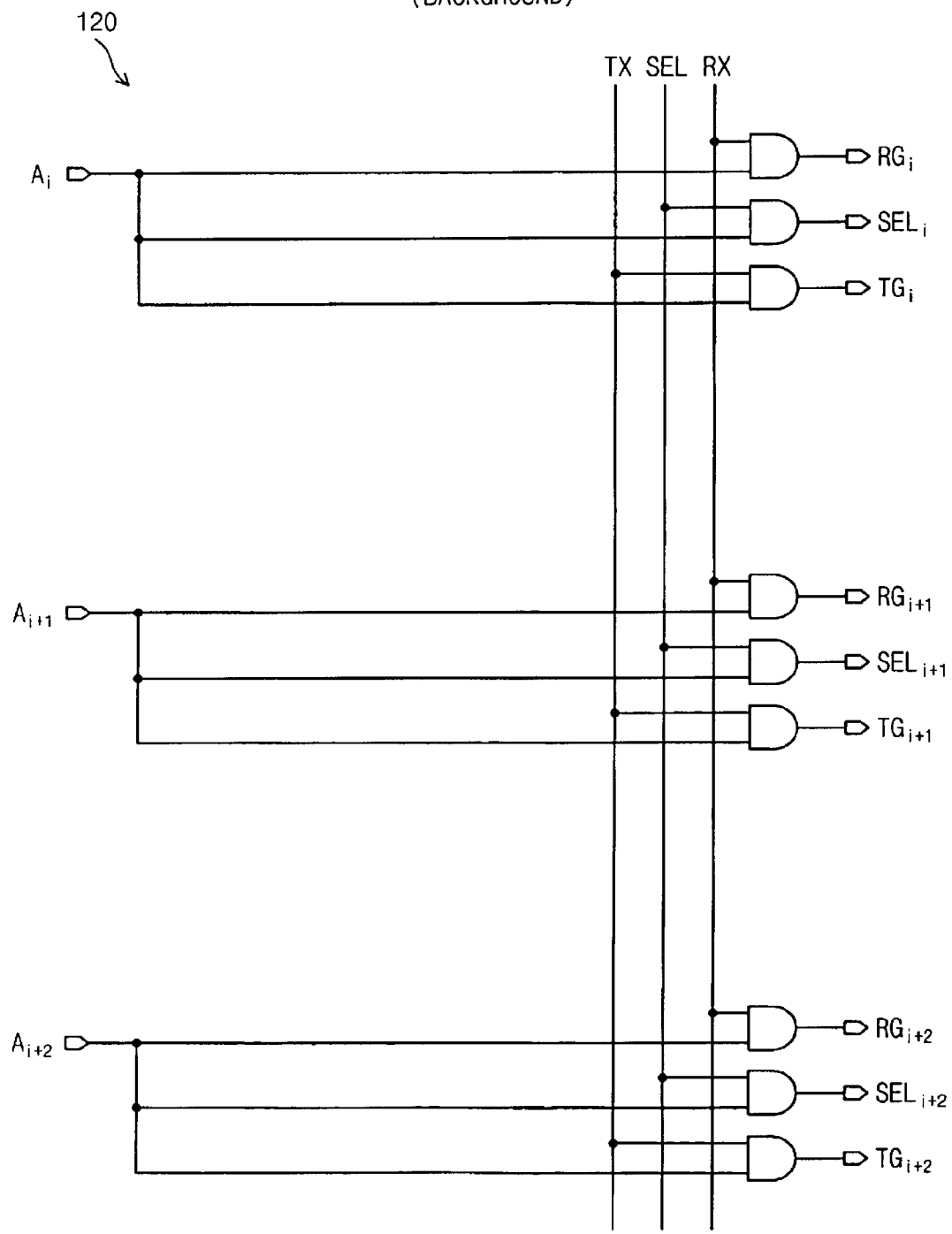
FIG. 5 shows a diagram of a conventional circuit of a row decoder shown in FIG. 1.
Figure 6A:
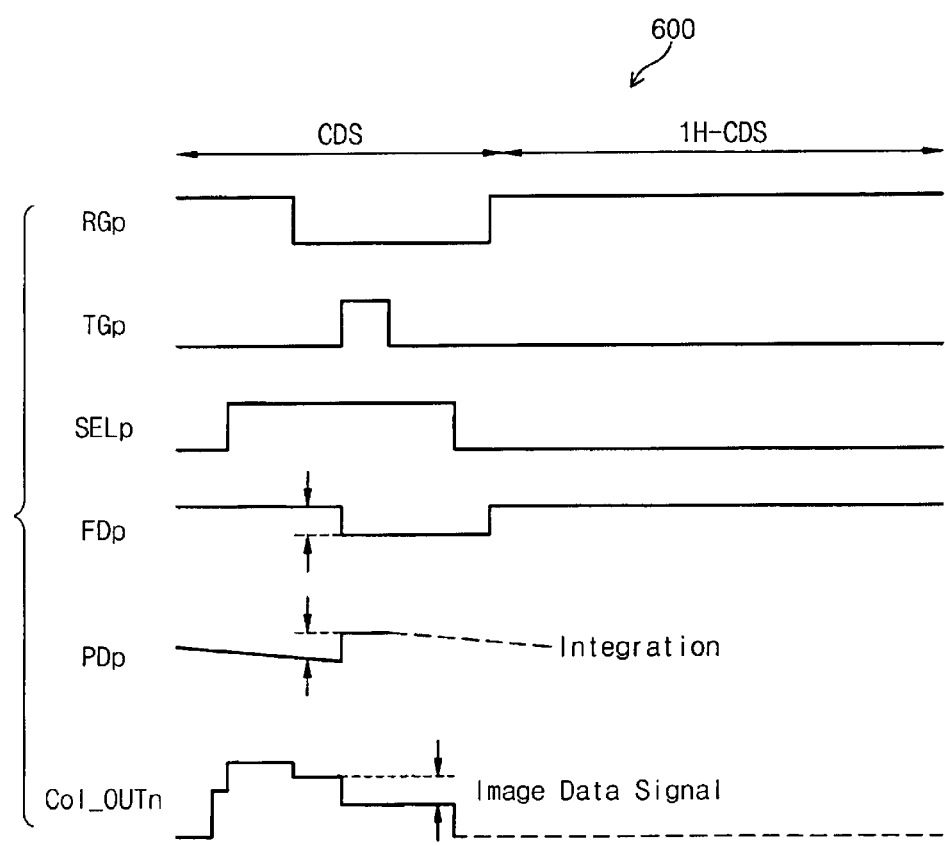
FIGS. 6A and 6B illustrate operational waveforms of unit cells of FIG. 2 connected to two rows and one column.
Figure 6B:
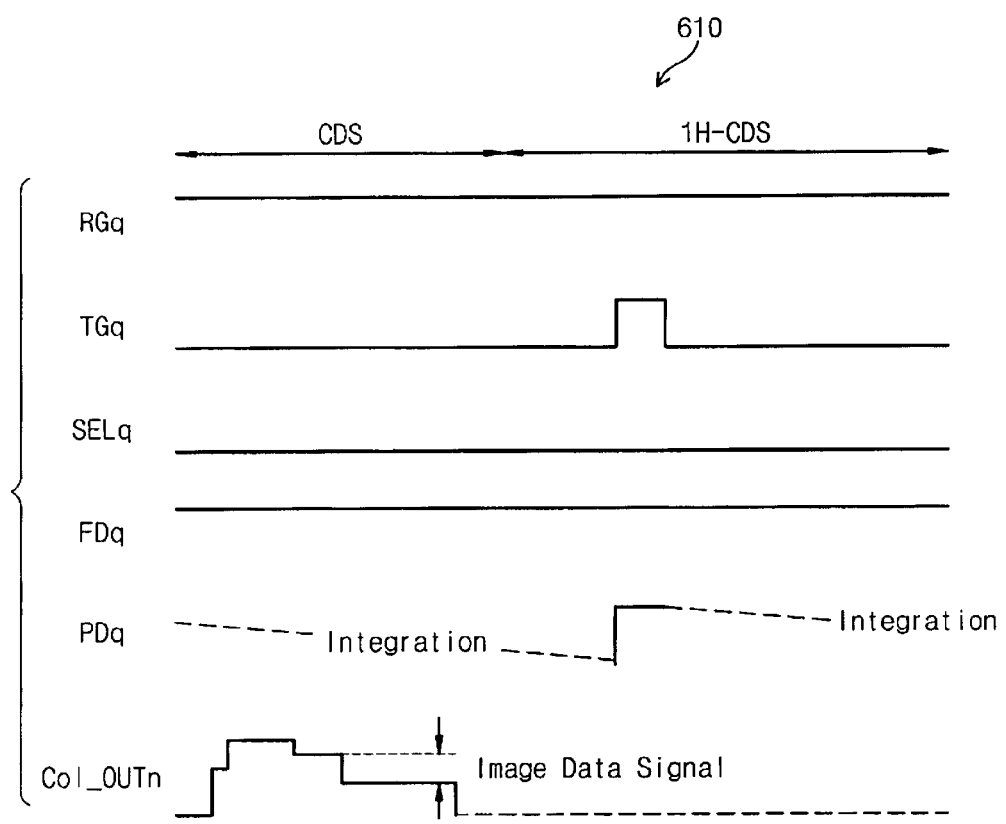
Figure 8:
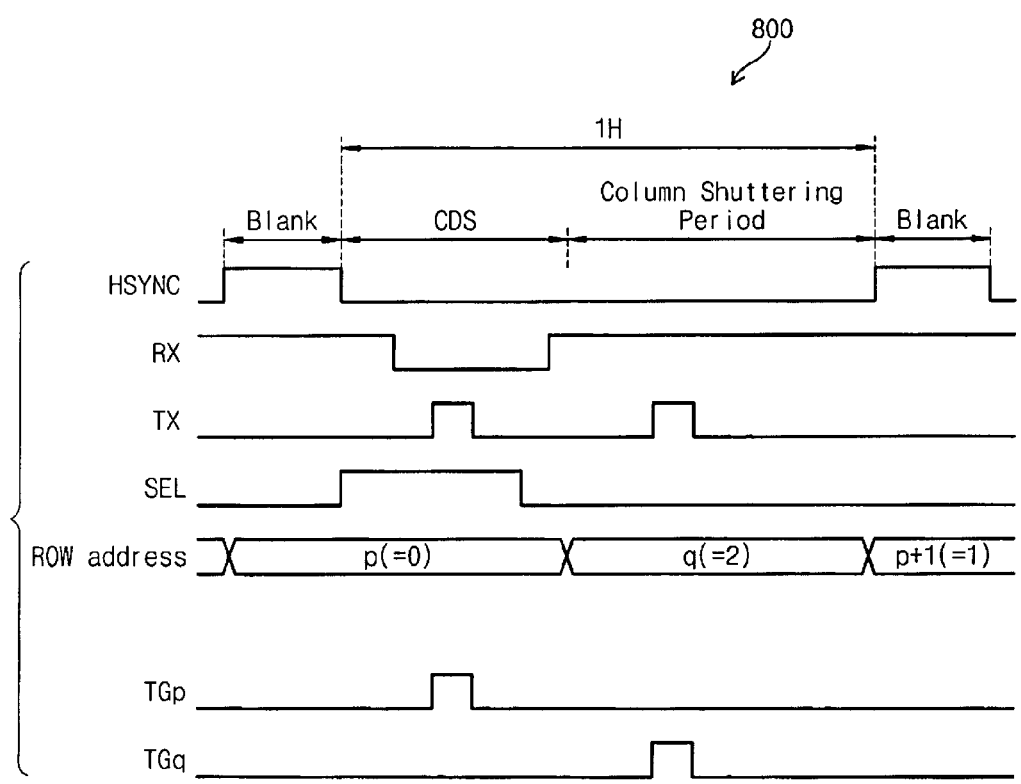
FIG. 8 illustrates an operation timing of row addressing shown in FIG. 2.
Figure 12:
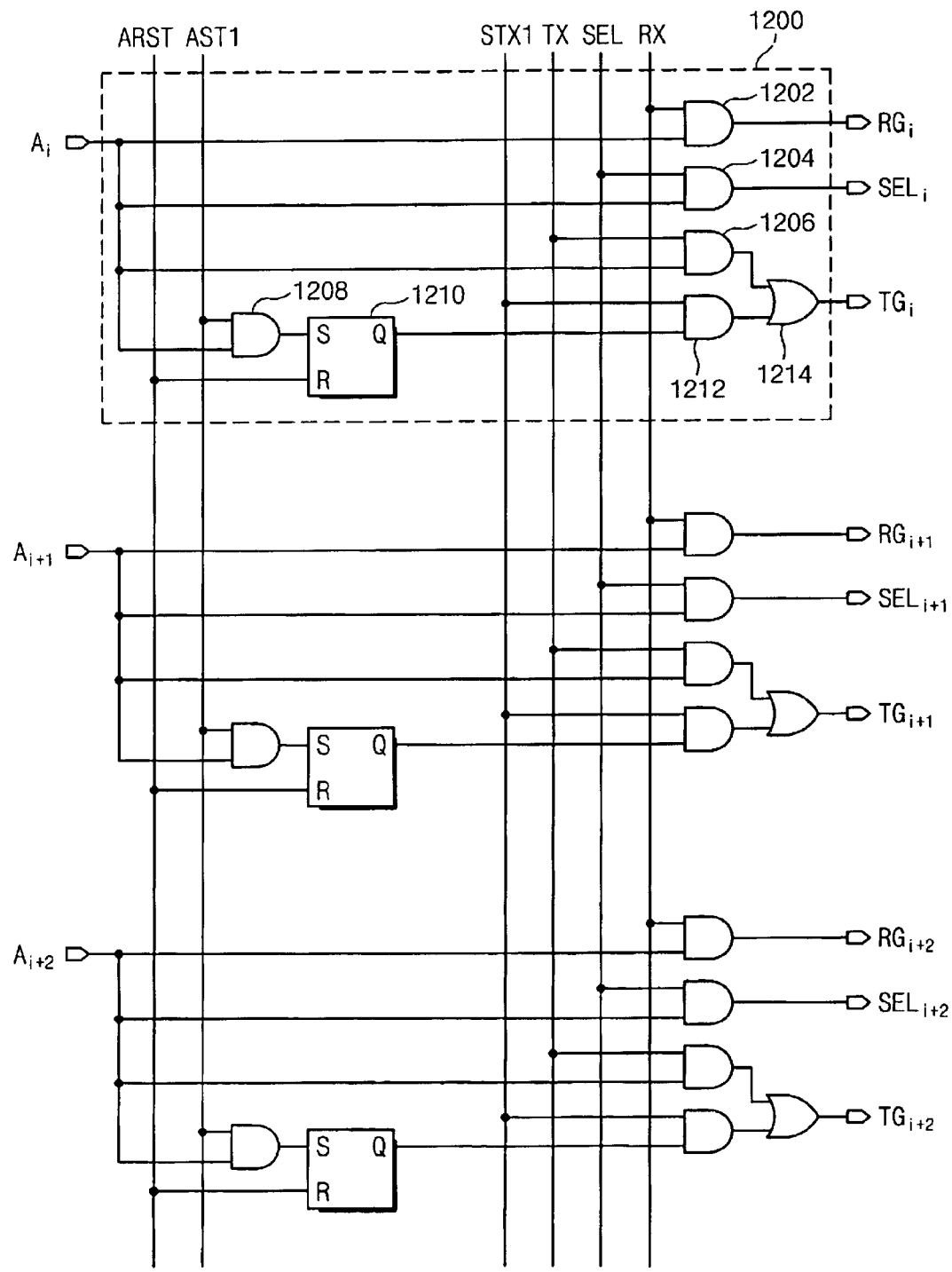
FIG. 12 illustrates a schematic first row decoder according to a first embodiment of the present invention.

FIG. 12 illustrates a row decoder according to a first embodiment of the present invention. The row decoder generates an i-th row, an i+1st row and an i+2$^{nd}$ row representatively as examples. A unit array 1200 of the row decoder includes first to fifth NAND gates 1202, 1204, 1206, 1208 and 1212, a latch 1210 and an OR gate 1214. The first NAND gate 1202 generates a reset gate signal $RG_i$ in response to the address signal $A_i$ and a reset signal RX. The second NAND gate 1204 generates a selection gate signal $SEL_i$ in response to the address signal $A_i$ and a selection signal SEL. The third NAND gate 1208 receives the address signal $A_i$ and an address latch signal AST1. The fourth NAND gate 1206 receives the address signal $A_i$ and a transmitted signal TX. The exemplary latch 1210 is an S-R latch and receives an address latch reset signal ARST at its reset terminal R and the output of the fourth NAND gate at its set terminal S. The fifth NAND gate 1212 receives the shutter transmitted signal STX1 and the output of the latch 1210. The OR gate 1214 receives the output of the third NAND gate 1206 and the output of the fifth NAND gate 1212 and generates the transmitted gate signal $TG_i$. The reset gate signal $RG_i$, the transmitted gate signal $TG_i$ and the selection gate signal $SEL_i$ select a unit pixel such as shown in FIG. 2.

Figure 13:
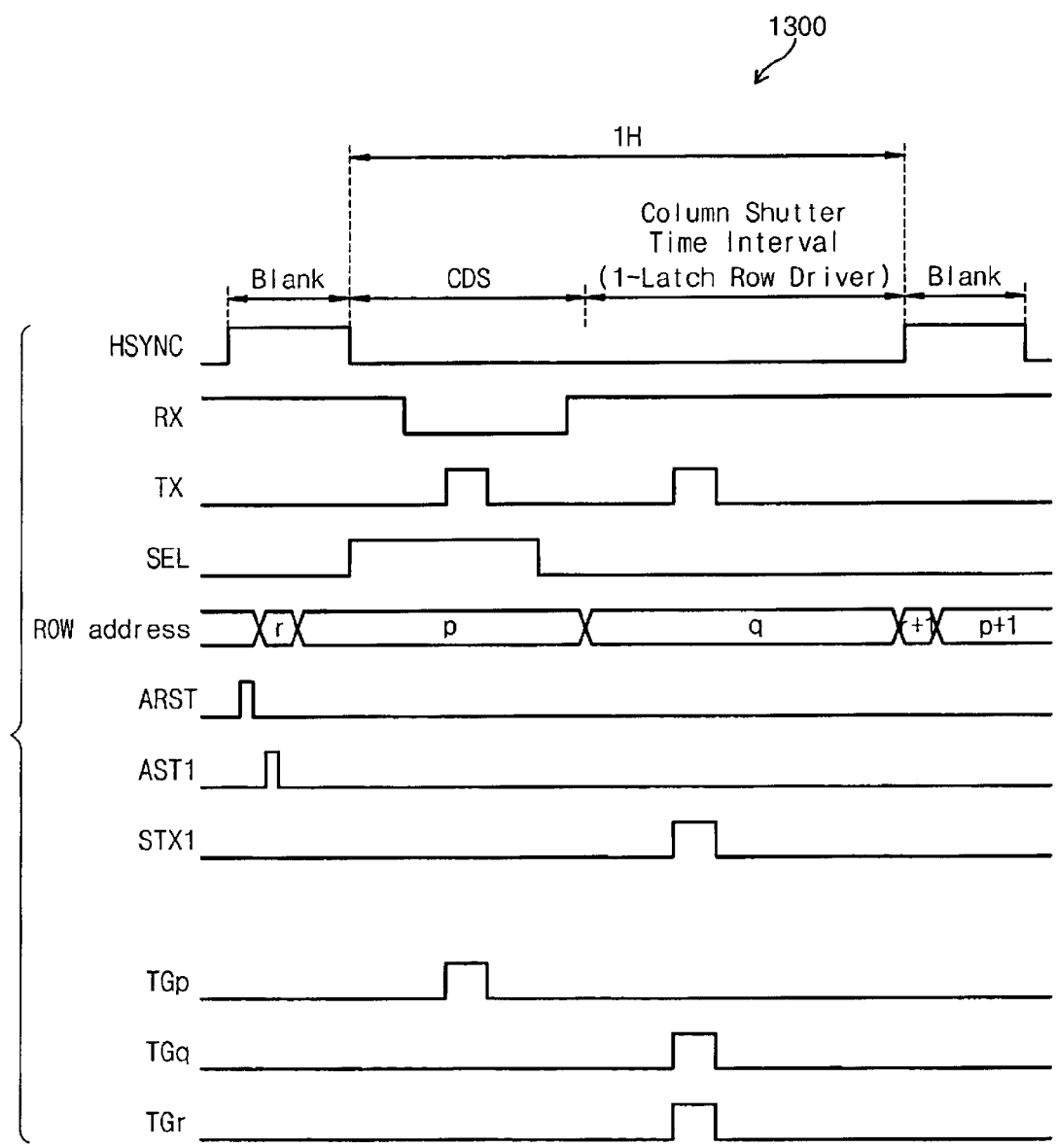
FIG. 13 illustrates an operational timing diagram of the first row decoder of FIG. 12.

FIG. 13 illustrates an operational timing diagram 1300 of the row decoder shown in FIG. 12. Referring to FIG. 13, the r-th row address is stored in the latch 1210 in accordance with the blank interval of the horizontal synchronization signal HSYNC. After that, during 1H time, CDS operation is performed for the p-th row address and a shuttering operation for the q-th row address and the r-th row address.

In the next blank interval of the horizontal synchronization signal HSYNC, the r+1$^{st}$ row address that is next by 1 from the r-th row address is stored in the latch 1210. This means that the fourth row address of the second frame data shown in FIG. 7 is stored in the latch 1210 and the row addresses 5, 6, 7, 8 and 9 increased by 1 for every blank interval of the horizontal synchronization signal HSYNC is stored in the latch so that the shuttering operation is performed for the corresponding row address.

Accordingly, with embodiments of the present invention, even if the row shutter value cintr is abruptly changed, the row address of the frame data is stored in the latch and the shuttering operation is performed increasing the corresponding row address by 1. And after that, the CDS operation is performed. Thus, image data sampling is possible without invalid data.

Figure 1:
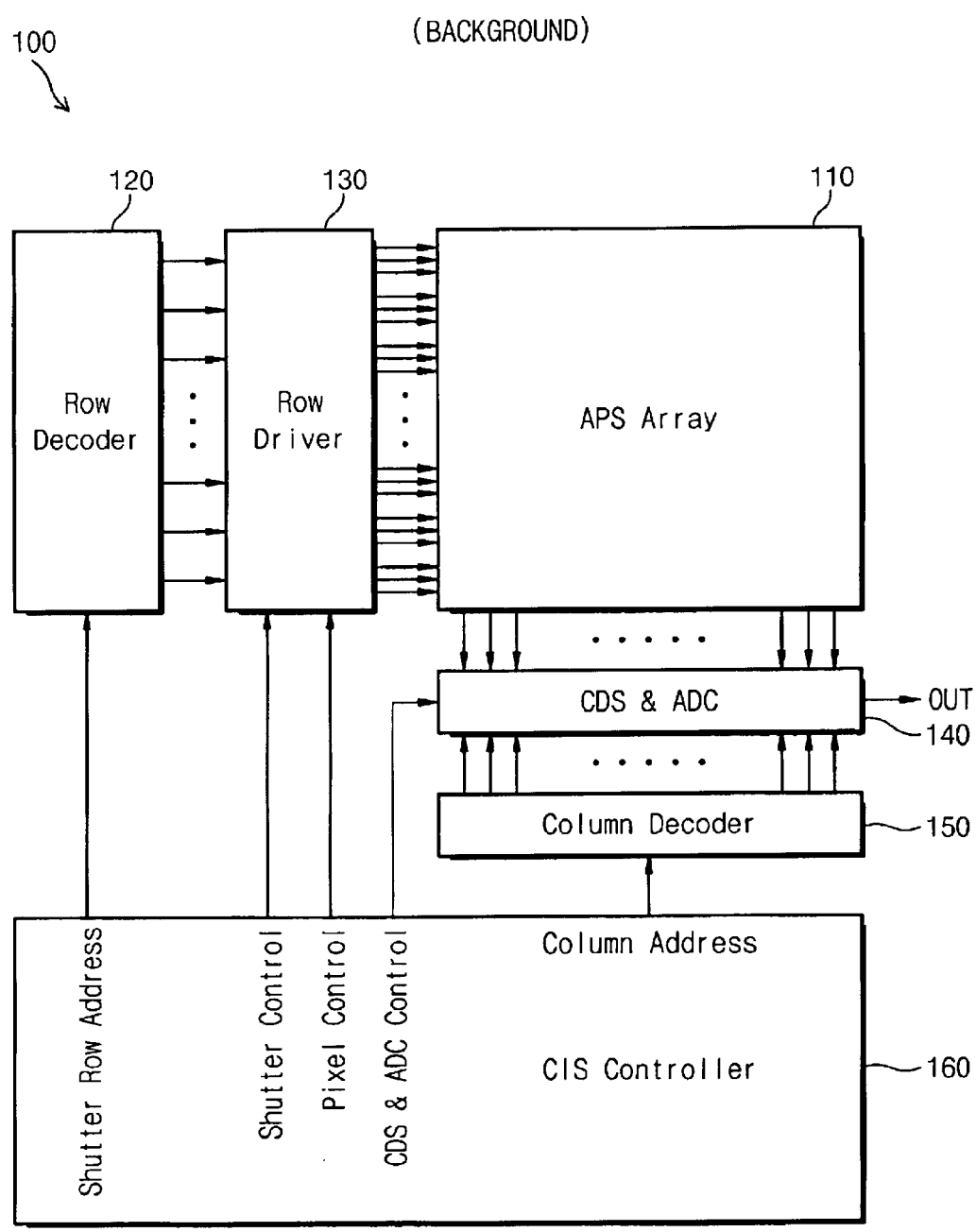
FIG. 1 shows a block diagram of a conventional CMOS image sensor.
Figure 14:
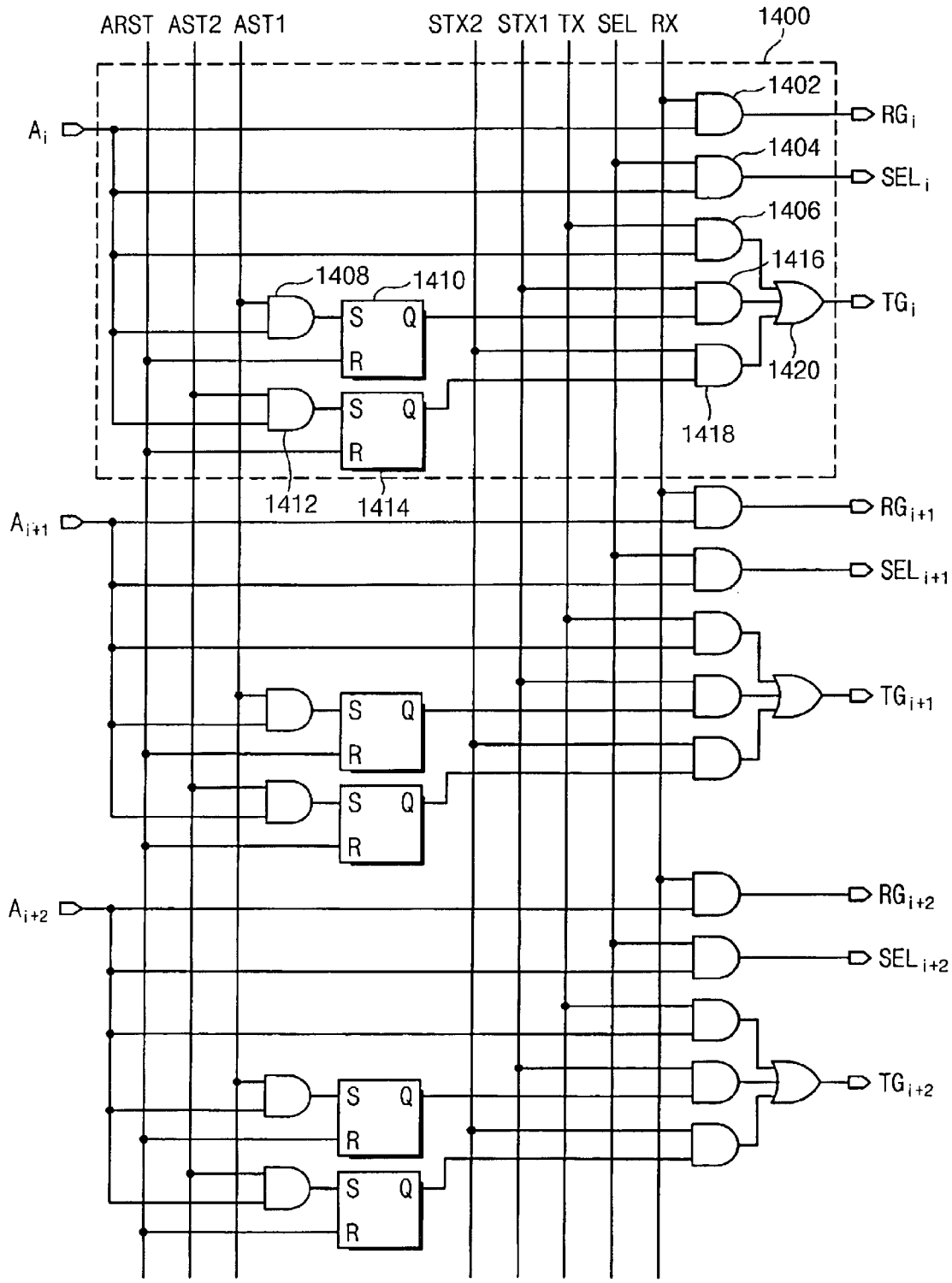
FIG. 14 illustrates a schematic second row decoder according to the first embodiment of the present invention.

FIG. 14 illustrates a row decoder according to a first embodiment of the present invention. Referring to FIG. 14, the row decoder shown in FIG. 14 is different from the row decoder shown in FIG. 12 in that the row decoder shown in FIG. 14 has two latches. The unit array 1400 of the row decoder includes a first NAND gate 1402 for receiving an address signal $A_i$ and a reset signal RX and generating a reset gate signal $RX_i$, a second NAND gate 1404 for receiving an address signal $A_i$ and a selection signal SEL and generating a selection gate signal $SEL_i$, and a third NAND gate 1406 for receiving the address signal $A_i$ and a transmitted signal TX. The unit array 1400 of the row decoder further includes a fourth NAND gate 1408 for receiving address signal $A_i$ and a first address latch signal AST1, and a fifth NAND gate 1412 for receiving the address signal $A_i$ and a second address latch signal AST2. The output of the fourth NAND gate 1408 is inputted to a set terminal S of the first latch 1410 and the output of the fifth NAND gate 1412 is inputted to a set terminal S of the second latch 1414. The reset terminals R of the first and second latch 1410 and 1414 are connected to an address latch reset signal ARST. The output of the third NAND gates 1406, the output of the first latch 1410 and the output of the second latch 1414 are inputted to the OR gate 1420 and the OR gate 1420 generates a transmitted gate signal $TG_i$. The reset gate signal $RG_i$, the transmitted gate signal $TG_i$ and the selection gate signal $SEL_i$ select the unit pixel shown in FIG. 1.

Figure 15:
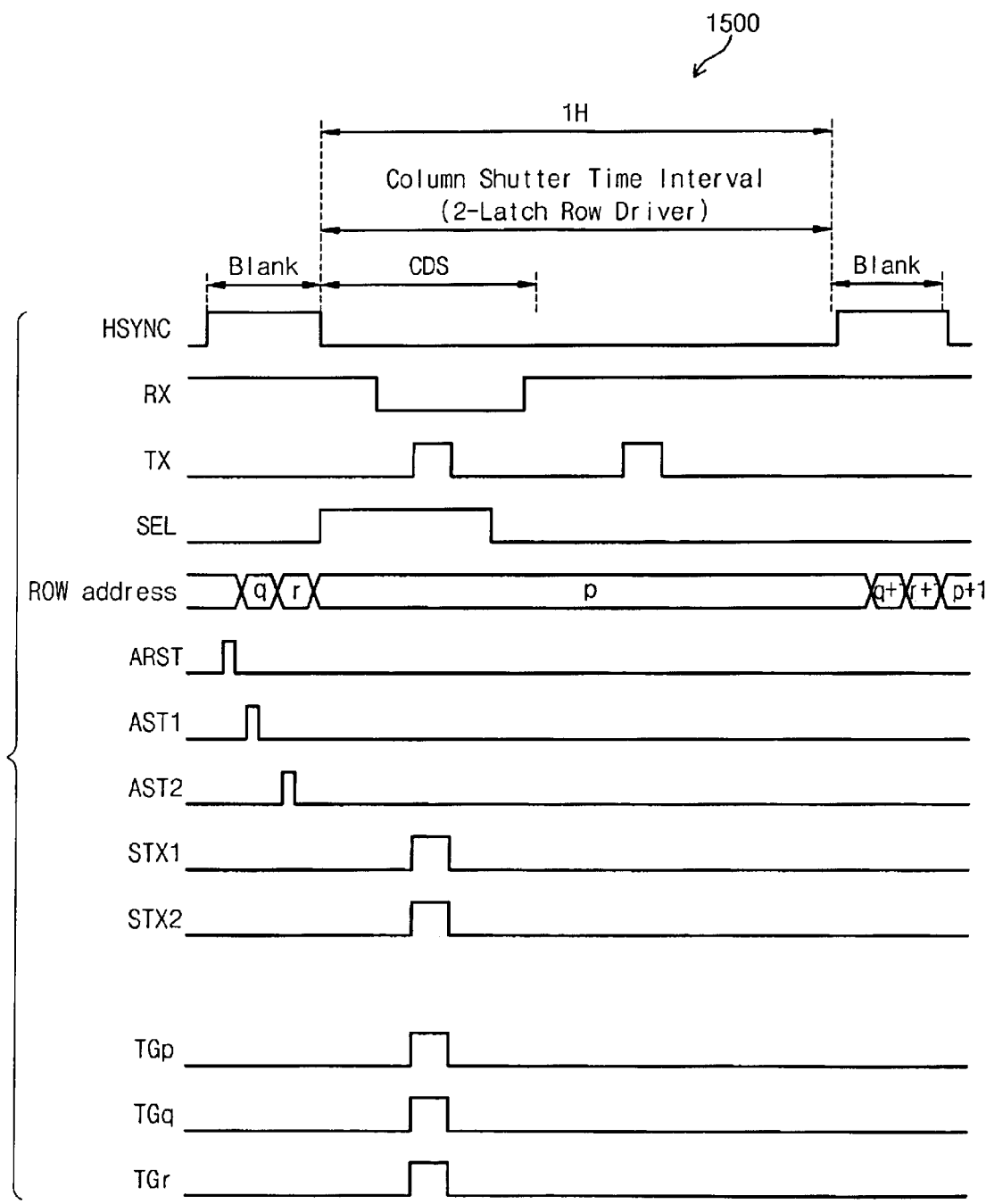
FIG. 15 illustrates an operational timing diagram of the second row decoder of FIG. 14.

FIG. 15 illustrates an operational timing diagram 1500 of the row decoder shown in FIG. 14. Referring to FIG. 15, in the blank interval of the horizontal synchronization signal HSYNC, two row addresses, that is, the q-th row address and the r-th row address are stored in the first latch 1410 and the second latch 1414, respectively. After that, during 1H time, the CDS operation is performed for the p-th row address and simultaneously the shuttering operation is performed for the q-th row address and the r-th row address. During the next blank interval of the horizontal synchronization signal HSYNC, the q+1$^{st}$ row address and the r+1$^{st}$ row address are stored in the first latch 1410 and the second latch 1414, respectively.

Accordingly, in the present embodiment, since the addresses latched by two latches of the row decoder are increased by 1 and a sequential shuttering operation is performed, invalid data such as the second frame shown in FIG. 7 can be prevented from being generated.

According to an embodiment of the present invention, since a shuttering row address is latched in accordance with the blank interval of the horizontal synchronization signal using one or two latches of the row decoder, and after that, the shuttering operation is performed sequentially by increasing the shuttering row address by 1, the invalid data that are not shuttered are prevented from being generated though the row shutter value may be changed suddenly.

In an aspect of the present invention, there is provided a row decoder of a CMOS image sensor, the row decoder addressing to a plurality of pixels arranged in rows and columns in a CMOS image sensor, the row decoder including a plurality of unit arrays, wherein the unit array comprises: a first NAND gate for generating a reset gate signal in response to an address signal and a reset signal; a second NAND gate for generating a selection gate signal in response to the address signal and a selection signal; a latch for resetting an output thereof in response to an address latch signal and latching the address signal as the output in response to the address latch signal and the address signal; a third NAND gate for receiving the address signal and a transmitted signal; a fourth NAND gate for receiving the output of the latch and a shutter transmitted signal; and an OR gate for receiving the outputs of the third and fourth NAND gates and generating a transmitted gate signal.

Preferably, the latch is an S-R latch and the latch latches the address signal during a black interval of a horizontal synchronization signal.

In another aspect of the present invention, there is provided a row decoder of a CMOS image sensor, the row decoder addressing to a plurality of pixels arranged in rows and columns in a CMOS image sensor, the row decoder including a plurality of unit arrays, wherein the unit array comprises: a first NAND gate for generating a reset gate signal in response to an address signal and a reset signal; a second NAND gate for generating a selection gate signal in response to the address signal and a selection signal; a first latch for resetting an output thereof in response to an address latch signal and latching the address signal as the output in response to a first address latch signal and the address signal; a second latch for resetting an output thereof in response to the address latch signal and latching the address signal as the output in response to a second address latch signal and the address signal; a third NAND gate for receiving the address signal and a transmitted signal; a fourth NAND gate for receiving the output of the first latch and a first shutter transmitted signal; a fifth NAND gate for receiving the output of the second latch and a second shutter transmitted signal; and an OR gate for receiving the outputs of the third to fifth NAND gates and generating a transmitted gate signal.

Accordingly, in the present invention, since the shuttering row address is latched in accordance with the blank interval of a horizontal synchronization signal using one or two latches in the row decoder and shuttering operation is performed sequentially with increasing the shuttering row address by 1, invalid data which are not shuttered though row shutter value is abruptly changed are prevented from being generated.

Although the present invention is described using the above-described exemplary embodiments, it shall be understood that they are merely exemplary and do not limit the foundation or scope of the present invention. Accordingly, for example, it is understood that although the currently preferred embodiments of the present invention relate to using one or two latches of the row decoder, a plurality of latches of the row decoder can also be used in alternate embodiments.

Accordingly, it will be apparent to those of ordinary skill in the pertinent art that various modifications and variations can be made to embodiments of the present invention without departing from the scope or spirit of the present disclosure. Thus, it is intended that the present invention, as claimed, cover all such modifications and variations that come within the scope or spirit of the appended claims or their equivalents.

What is claimed is:

1. A row decoder of a CMOS image sensor, the row decoder addressing to a plurality of pixels arranged in rows and columns in a CMOS image sensor, the row decoder including a plurality of unit arrays, wherein a unit array comprises:
   a first NAND gate for generating a reset gate signal in response to an address signal and a reset signal;
   a second NAND gate for generating a selection gate signal in response to the address signal and a selection signal;
   a first latch for resetting an output thereof in response to an address latch signal and latching the address signal as the output in response to the address latch signal and the address signal;
   a third NAND gate for receiving the address signal and a transmitted signal;
   a fourth NAND gate for receiving the output of the latch and a shutter transmitted signal; and
   an OR gate for receiving the outputs of the third and fourth NAND gates and generating a transmitted gate signal.

2. The row decoder of claim 1, wherein the latch is an S-R latch.

3. The row decoder of claim 1, wherein the latch latches the address signal during a black interval of a horizontal synchronization signal.

4. The row decoder of claim 1, the unit array further comprising:
   a second latch for resetting an output thereof in response to the address latch signal and latching the address signal as the output in response to a second address latch signal and the address signal; and
   a fifth NAND gate for receiving the output of the second latch and a second shutter transmitted signal;
   wherein the OR gate is for receiving the outputs of the third through fifth NAND gates and generating the transmitted gate signal.

5. The row decoder of claim 4, wherein the first and second latches are S-R latches.

6. The row decoder of claim 4, wherein the first and second latches latch the address signal during a black interval of a horizontal synchronization signal.

7. A CMOS image sensor comprising:
   a plurality of pixels arranged in rows and columns;
   a row decoder in signal communication with the plurality of pixels for generating an address signal; and
   a plurality of unit arrays in signal communication with the row decoder, each unit array comprising;
   a first NAND gate for generating a reset gate signal in response to the address signal and a reset signal;
   a second NAND gate for generating a selection gate signal in response to the address signal and a selection signal;
   a first latch for resetting an output thereof in response to an address latch signal and latching the address signal as the output in response to the address latch signal and the address signal;
   a third NAND gate for receiving the address signal and a transmitted signal;
   a fourth NAND gate for receiving the output of the latch and a shutter transmitted signal; and
   an OR gate for receiving the outputs of the third and fourth NAND gates and generating a transmitted gate signal.

8. A CMOS image sensor as defined in claim 7 wherein the latch of a unit array is an S-R latch.

9. A CMOS image sensor as defined in claim 7 wherein the latch of a unit array latches the address signal during a black interval of a horizontal synchronization signal.

10. A CMOS image sensor as defined in claim 7, a unit array further comprising:
    a second latch for resetting an output thereof in response to the address latch signal and latching the address signal as the output in response to a second address latch signal and the address signal; and
    a fifth NAND gate for receiving the output of the second latch and a second shutter transmitted signal;
    wherein the OR gate is for receiving the outputs of the third through fifth NAND gates and generating the transmitted gate signal responsive thereto.

11. A CMOS image sensor as defined in claim 10 wherein the first and second latches of a unit array are S-R latches.

12. A CMOS image sensor as defined in claim 10 wherein the first and second latches of a unit array latch the address signal during a black interval of a horizontal synchronization signal.

13. A row decoder of a CMOS image sensor for addressing a plurality of pixels arranged in rows and columns, the row decoder including a plurality of unit arrays, each unit array comprising:
    gate reset means for generating a reset gate signal in response to an address signal and a reset signal;
    gate selection means for generating a selection gate signal in response to the address signal and a selection signal;
    first latch reset means for resetting a latch output signal in response to an address latch signal;
    first latch set means for latching the address signal as the latch output signal in response to the address latch signal and the address signal; and
    gate transmission means for generating a transmitted gate signal in response to the address signal, a transmitted signal, the latched output signal, and a shutter transmitted signal.

14. A row decoder as defined in claim 13 wherein the latch set means of a unit array comprises an S-R latch.

15. A row decoder as defined in claim 13 wherein the latch set means of a unit array latches the address signal during a black interval of a horizontal synchronization signal.

16. A row decoder as defined in claim 13, a unit array further comprising:
    second latch reset means for resetting a second latched output signal in response to the address latch signal;
    second latch set means for latching the address signal as the second latched output signal in response to a second address latch signal and the address signal; and
    gate transmission means for generating the transmitted gate signal in response to the address signal, the transmitted signal, the latched output signal, the shutter transmitted signal, the second latched output signal, and a second shutter transmitted signal.

17. A row decoder as defined in claim 16 wherein the second latch set means of a unit array comprises an S-R latch.

18. A row decoder as defined in claim 16 wherein the second latch set means of a unit array latches the address signal during a black interval of a horizontal synchronization signal.

* * * * *